US012775020B2

(12) United States Patent
Zhao et al.

(10) Patent No.: US 12,775,020 B2

(45) Date of Patent: Oct. 27, 2026

(54) MICROFLUIDIC DETECTION SYSTEM, CONTROL METHOD THEREFOR, AND REFRIGERATOR

(71) Applicants: QINGDAO HAIER REFRIGERATOR CO., LTD., Qingdao (CN); HAIER SMART HOME CO., LTD., Qingdao (CN)

(72) Inventors: Bintang Zhao, Qingdao (CN); Bin Fei, Qingdao (CN); Haoquan Liu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 847 days.

(21) Appl. No.: 18/246,530

(22) PCT Filed: Sep. 15, 2021

(86) PCT No.: PCT/CN2021/118504

§ 371 (c)(1),
(2) Date: Mar. 24, 2023

(87) PCT Pub. No.: WO2022/062994

PCT Pub. Date: Mar. 31, 2022

(65) Prior Publication Data

US 2023/0375586 A1 Nov. 23, 2023

(30) Foreign Application Priority Data

Sep. 27, 2020 (CN) ......................... 202011029746.7

(51) Int. Cl.
*G01N 35/10* (2006.01)
*B01L 3/00* (2006.01)

(52) U.S. Cl.
CPC ........ *G01N 35/1016* (2013.01); *B01L 3/5027* (2013.01); *B01L 2200/14* (2013.01); *G01N 2035/1034* (2013.01)

(58) Field of Classification Search
None
See application file for complete search history.

(56) References Cited

U.S. PATENT DOCUMENTS 7,704,457 B2 * 4/2010 Patton ................. B01F 25/4331 422/82.07
11,499,183 B2 * 11/2022 Stumbo ............. G01N 15/1434
(Continued)

FOREIGN PATENT DOCUMENTS

CN 108801929 A 11/2018
CN 208526655 U 2/2019
(Continued)

OTHER PUBLICATIONS

International Search Report and Written Opinion for PCT/CN2021/118504 (ISA/CN) mailed Dec. 1, 2021 w/English translation (11 pages).
(Continued)

*Primary Examiner* — Brian R Gordon
(74) *Attorney, Agent, or Firm* — troutman pepper locke; Tim Tingkang Xia, Esq.

(57) ABSTRACT

Provided are a microfluidic detection system (1), a control method therefor, and a refrigerator (100). The microfluidic detection system (1) includes a microfluidic biochip (10), a sample liquid driving apparatus (40), and a detection mechanism (20). The microfluidic biochip (10) is provided with a sample inlet (111), a communication port (112), and a detection pool (121). The control method includes: driving a sample liquid with the sample liquid driving apparatus (40) to flow into the detection pool (121) (S70); detecting the detection pool (121) with the detection mechanism (20), and
(Continued)

controlling the sample liquid driving apparatus (40) to periodically and repeatedly execute a first liquid pushing and drawing operation which includes a first liquid pushing action for prompting the sample liquid to flow towards the sample inlet (111), and a first liquid drawing action for prompting the sample liquid to flow towards the detection pool (121) (S80).

8 Claims, 10 Drawing Sheets

(56) References Cited

U.S. PATENT DOCUMENTS

| | | | | |
|---|---|---|---|---|
| 12,239,987 | B2 * | 3/2025 | Stumbo | C12Q 1/6848 |
| 2007/0122819 | A1 | 5/2007 | Wu et al. | |
| 2012/0003725 | A1 | 1/2012 | Lim et al. | |
| 2018/0169648 | A1 | 6/2018 | Trau et al. | |
| 2019/0002956 | A1 * | 1/2019 | Stumbo | G01N 15/1434 |

FOREIGN PATENT DOCUMENTS

| | | | |
|---|---|---|---|
| CN | 109420531 | A | 3/2019 |
| CN | 109490058 | A | 3/2019 |
| CN | 109499633 | A | 3/2019 |
| CN | 109499634 | A | 3/2019 |
| CN | 109668883 | A | 4/2019 |
| CN | 209570508 | U | 11/2019 |
| DE | 202007007707 | U1 | 8/2007 |

OTHER PUBLICATIONS

1st EP Office Action for European Patent Application No. 21871365.9 dated Feb. 9, 2024 (7 pages).

European Search Report for European Patent Application No. 21871365.9 dated Jan. 30, 2024 (4 pages).

SIPO, "CN Search Report for CN Application No. 202011029746.7", China, Not in English.

* cited by examiner

MICROFLUIDIC DETECTION SYSTEM, CONTROL METHOD THEREFOR, AND REFRIGERATOR

CROSS-REFERENCE TO RELATED APPLICATIONS

The present application is a national phase entry of International Application No. PCT/CN2021/118504, filed Sep. 15, 2021, which claims priority to Chinese Application No. 202011029746.7, filed Sep. 27, 2020, which are each incorporated herein by reference in its entirety.

FIELD OF THE INVENTION

The present invention relates to refrigerating and freezing technologies, and particularly to a control method for a microfluidic detection system, the microfluidic detection system, and a refrigerator.

BACKGROUND OF THE INVENTION

With the improvement of the living standard of people, pesticide residues, viruses, nutritional elements or other aspects of some edible food materials are usually required to be detected in daily life, so as to qualitatively or quantitatively obtain the conditions of the food materials. For example, due to the pesticide abuse problem, fruits, vegetables and agricultural and sideline products purchased daily by people may have the problem of excessive pesticide residue content, and if the problem of excessive pesticide residue content of the foods cannot be found in time, great harm may be caused after people ingest the foods. For another example, currently advocated breast feeding is best feeding for infants only when breast milk has normal nutritional value, but in cases of diseases, medicine taking, surgery or other cases of the mother, the milk secreted by the mother may have reduced content of nutritional elements and even produce viruses, thereby affecting the growth and health of the infants.

Among detection methods, the method for detection by using a microfluidic biochip is rapid, the size is small, and the method is suitable for household use. In order to make sample introduction of the microfluidic biochip more accurate and easy to control, a driving apparatus may be used to drive a sample liquid into the microfluidic biochip. However, mixture between the sample liquid and a reagent in the microfluidic biochip is quite uneven, such that a reaction therebetween is not sufficient, thus affecting the accuracy of a detection result.

BRIEF DESCRIPTION OF THE INVENTION

An object of a first aspect of the present invention is to overcome at least one of the drawbacks of the prior art, and to provide a control method for a microfluidic detection system capable of improving the uniformity of mixture between a sample liquid entering a microfluidic biochip and a reagent therein, so as to guarantee the accuracy of a detection result.

A further object of the first aspect of the present invention is to avoid the problem that a part of the sample liquid flows out from a sample inlet to cause contamination when a sample liquid driving apparatus performs a liquid pushing action.

Another object of the first aspect of the present invention is to further improve the accuracy of the detection result.

An object of a second aspect of the present invention is to provide a microfluidic detection system operating according to any one of the above-mentioned control methods.

An object of a third aspect of the present invention is to provide a refrigerator having a microfluidic detection system operating according to any one of the above-mentioned methods.

According to a first aspect of the present invention, there is provided a control method for a microfluidic detection system, the microfluidic detection system including a microfluidic biochip, a sample liquid driving apparatus and a detection mechanism, the microfluidic biochip being provided with a sample inlet for receiving a sample liquid, a communication port communicated with the sample liquid driving apparatus and a detection pool formed inside the microfluidic biochip, and the sample inlet, the detection pool and the communication port being communicated in sequence; the control method including:

- driving the sample liquid with the sample liquid driving apparatus to flow into the detection pool; and
- detecting the detection pool with the detection mechanism, and controlling the sample liquid driving apparatus to periodically and repeatedly execute a first liquid pushing and drawing operation, the first liquid pushing and drawing operation including a first liquid pushing action used for prompting the sample liquid to flow in the direction of the sample inlet, and a first liquid drawing action used for prompting the sample liquid to flow in the direction of the detection pool.

Optionally, the microfluidic biochip is further provided with a reaction pool connected between the detection pool and the sample inlet, and the sample inlet, the reaction pool, the detection pool and the communication port are sequentially communicated through a micro-channel; and

- before driving the sample liquid to flow into the detection pool, the control method further includes:
- starting the sample liquid driving apparatus in a state where the sample inlet is in contact with the sample liquid, so as to drive the sample liquid to flow into the reaction pool by the sample liquid driving apparatus.

Optionally, after driving the sample liquid to flow into the reaction pool and before driving the sample liquid to flow into the detection pool, the control method further includes:

- controlling the sample liquid driving apparatus to periodically and repeatedly execute a second liquid pushing and drawing operation until the number of the second liquid pushing and drawing operations reaches a second preset number; the second liquid pushing and drawing operation including a second liquid pushing action for promoting the sample liquid to flow towards the sample inlet and a second liquid drawing action for promoting the sample liquid to flow towards the reaction pool.

Optionally, after driving the sample liquid to flow into the reaction pool and before controlling the sample liquid driving apparatus to periodically and repeatedly execute a second liquid pushing and drawing operation, the control method further includes:

- switching the microfluidic biochip to a state where the sample inlet thereof is separated from the sample liquid; and
- controlling the sample liquid driving apparatus to execute a third liquid drawing action for promoting the sample liquid to flow towards the reaction pool, such that at least part of the sample liquid in the micro-channel connected between the reaction pool and the sample inlet flows into the reaction pool, thus forming a preset space margin in the micro-channel, the preset space margin being used for accommodating the sample liquid pushed out by the sample liquid driving apparatus when the sample liquid driving apparatus executes the second liquid pushing action.

Optionally, after driving the sample liquid to flow into the reaction pool and before controlling the sample liquid driving apparatus to periodically and repeatedly execute a second liquid pushing and drawing operation, the control method further includes:

judging whether the quantity of the sample liquid in the reaction pool reaches a preset sample liquid volume value; and if yes, controlling the sample liquid driving apparatus to periodically and repeatedly execute the second liquid pushing and drawing operation.

Optionally, the step of judging whether the quantity of the sample liquid in the reaction pool reaches a preset sample liquid volume value includes:

judging whether a trigger signal for indicating that a piston of the sample liquid driving apparatus moves to a preset position is received; and if yes, determining that the quantity of the sample liquid in the reaction pool reaches the preset sample liquid volume value.

Optionally, the detection mechanism includes a light source and a photosensitive element arranged on two opposite sides of the detection pool respectively; the step of detecting the detection pool with the detection mechanism includes:

turning on the light source to irradiate light emitted from the light source to the detection pool;

acquiring a light intensity signal for indicating the intensity of the light transmitted through the detection pool by using the photosensitive element; and calculating a preset detection parameter of the sample liquid according to the light intensity signal.

Optionally, after the acquiring a light intensity signal and before the calculating a preset detection parameter of the sample liquid according to the light intensity signal, the control method further includes:

judging whether the light intensity signal is stable;

if the light intensity signal is stable, stopping the first liquid pushing and drawing operation of the sample liquid driving apparatus, and calculating the preset detection parameter of the sample liquid according to the light intensity signal; if the light intensity signal is unstable, judging whether the number of the first liquid pushing and drawing operations executed by the sample liquid driving apparatus reaches a first preset number; and if yes, stopping the first liquid pushing and drawing operation and sending prompt information for indicating failure or invalidation of the detection.

Optionally, the control method further includes:

after receiving a trigger signal for instructing starting of the detection function of the microfluidic detection system, starting a heating module of the microfluidic detection system, and heating the detection pool by the heating module;

acquiring the temperature of the detection pool periodically or in real time; and stopping the heating module when the temperature of the detection pool is higher than a preset upper temperature limit value, and restarting the heating module when the temperature in the detection pool is lower than a preset lower temperature limit value.

Optionally, after stopping the first liquid pushing and drawing operation of the sample liquid driving apparatus, the control method further includes:

turning off the light source and stopping the heating module.

Optionally, in one and the same first liquid pushing and drawing operation, the quantity of the sample liquid pushed out by the sample liquid driving apparatus performing the first liquid pushing action is the same as the quantity of the sample liquid sucked in by the sample liquid driving apparatus performing the first liquid drawing action; and in one and the same second liquid pushing and drawing operation, the quantity of the sample liquid pushed out by the sample liquid driving apparatus performing the second liquid pushing action is the same as the quantity of the sample liquid drawn in by the sample liquid driving apparatus performing the second liquid drawing action.

Optionally, controlling the sample liquid driving apparatus to periodically and repeatedly execute the first liquid pushing and drawing operation includes:

controlling the sample liquid driving apparatus to execute the first liquid pushing action, to push a preset quantity of the sample liquid out of the detection pool;

after waiting for a first preset duration, controlling the sample liquid driving apparatus to execute the first liquid drawing action, to enable the sample liquid pushed out of the detection pool to flow back to the detection pool; and after waiting for a second preset duration, controlling the sample liquid driving apparatus to execute the first liquid pushing action again, and repeating the process.

According to a second aspect of the present invention, there is further provided a microfluidic detection system operating according to any one of the above-mentioned control methods.

According to a third aspect of the present invention, there is further provided a refrigerator including a microfluidic detection system operating according to any one of the above-mentioned control methods.

In the control method according to the present application, the sample liquid driving apparatus is controlled to periodically and repeatedly execute the first liquid pushing and drawing operation including the first liquid pushing action and the first liquid drawing action after the sample liquid flows into the detection pool; since driving forces applied to the sample liquid by the first liquid pushing action and the first liquid drawing action have opposite directions, the sample liquid can be promoted to repeatedly flow back and forth in the microfluidic biochip, thereby facilitating mixture between the sample liquid and the reagent, improving the mixing effect of the sample liquid and the reagent, facilitating the full reaction between the sample liquid and the reagent, and improving the accuracy of the detection result.

Further, after the sample liquid enters the reaction pool, the sample liquid driving apparatus first executes a liquid drawing action (i.e., the third liquid drawing action), such that at least part of the sample liquid in the micro-channel connected between the reaction pool and the sample inlet flows into the reaction pool, thus forming the preset space margin in the micro-channel, the preset space margin being used for accommodating the sample liquid pushed out by the sample liquid driving apparatus when the sample liquid driving apparatus executes the second liquid pushing action. Thus, the problem of contamination due to a small quantity of the sample liquid being pushed out from the sample inlet when the sample liquid driving apparatus performs the second liquid pushing action can be avoided.

Further, in the present application, the quantity of the sample liquid entering the reaction pool is accurately controlled to be matched with the quantity of the reagent in the chip, thus avoiding the influence on the detection result caused by too much or too little sample liquid, and further improving the accuracy of the detection result.

Further, in the present application, the quantity of the sample liquid pushed out and the quantity of the sample liquid drawn in in one and the same liquid pushing and drawing operation are the same, thus avoiding that due to large error accumulation caused by executing the liquid pushing and drawing operation multiple times, the accuracy of the detection result is affected.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

The present application firstly provides a control method for a microfluidic detection system, which is used for qualitatively or quantitatively detecting a preset detection parameter of a sample liquid. The preset detection parameter may be, for example, a pesticide residue parameter for indicating whether a pesticide residue content exceeds the standard and/or a specific value of the pesticide residue content, a nutrient parameter for indicating whether a nutritional element meets the standard and/or a specific content of the nutritional element, a specific substance parameter for indicating whether a specific harmful substance (for example, a specific virus) exceeds the standard and/or a specific content thereof, or the like.

The control method for a microfluidic detection system can be generally divided into two parts of sample loading and detection. First, the detection part is specifically described in the present application.

Figure 1:
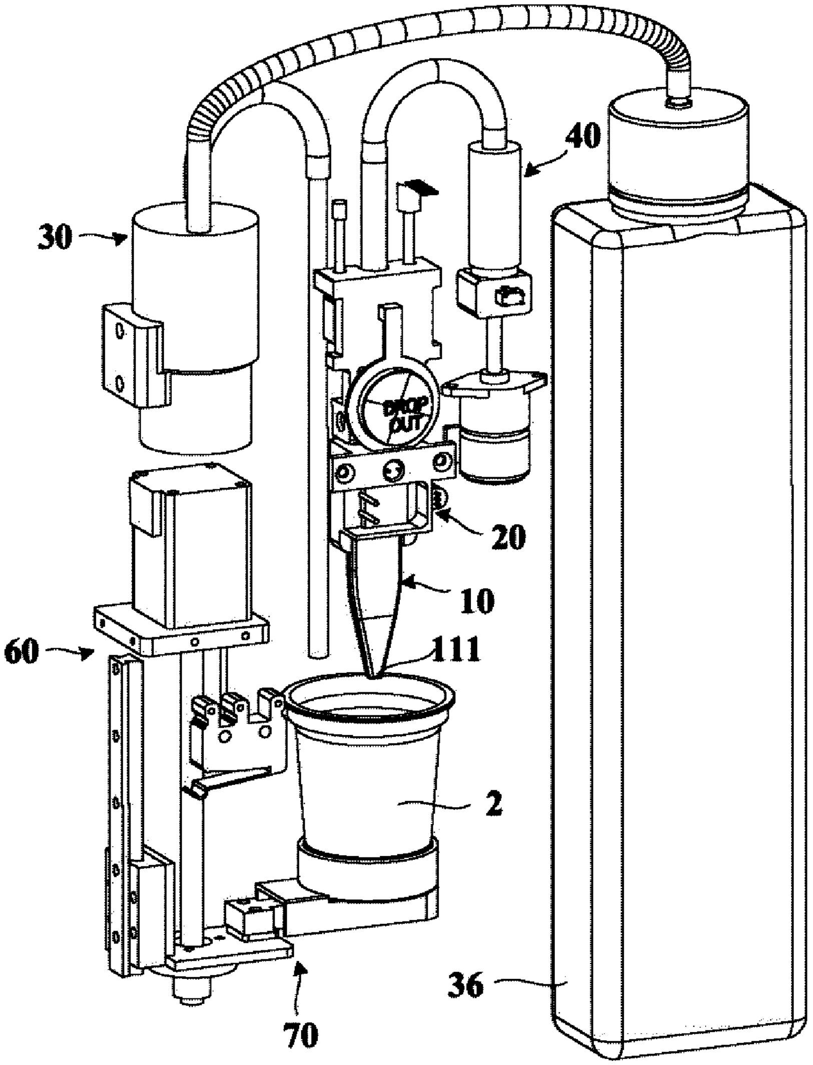
FIG. 1 is a schematic structural diagram of a microfluidic detection system according to an embodiment of the present invention.
Figure 2:
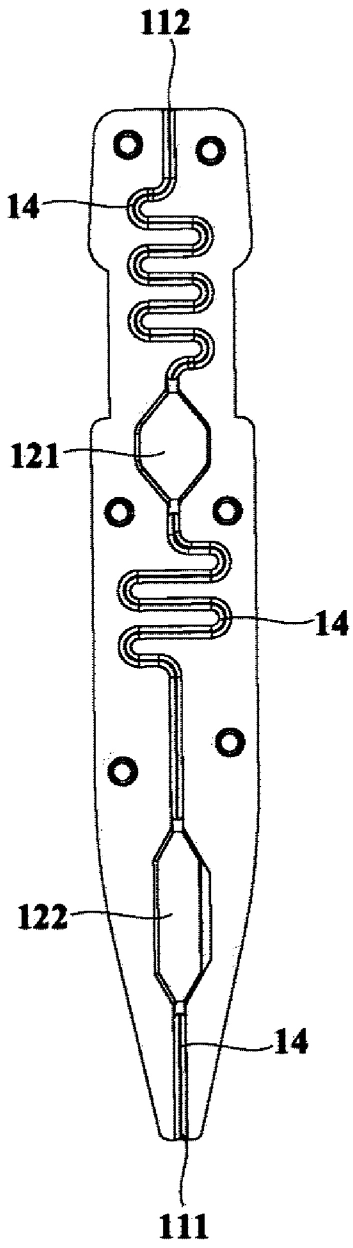
FIG. 2 is a schematic sectional diagram of a microfluidic biochip in an embodiment of the present invention.

FIG. 1 is a schematic structural diagram of the microfluidic detection system according to an embodiment of the present invention, and for ease of understanding, a sample cup 2 is also shown in FIG. 1. The microfluidic detection system 1 according to the present invention includes a microfluidic biochip 10, a sample liquid driving apparatus 40 and a detection mechanism 20. FIG. 2 is a schematic sectional diagram of the microfluidic biochip in an embodiment of the present invention. The microfluidic biochip 10 is provided with a sample inlet 111 for receiving a sample liquid, a communication port 112 communicated with the sample liquid driving apparatus 40 and a detection pool 121 formed inside the microfluidic biochip 121, the detection pool 121 is configured to hole a detection reagent, and the sample inlet 111, the detection pool 121 and the communication port 112 are communicated in sequence.

The applicant recognizes that in practical applications, the microfluidic biochip 10 is usually fixed, the sample liquid driving apparatus 40 and the microfluidic biochip 10 are usually communicated hermetically, and when the microfluidic detection system 1 is integrated on a refrigerator, the microfluidic biochip 10 is preferably vertically disposed with the sample inlet at the bottom thereof, such that since the oscillation amplitude of the microfluidic biochip 10 is quite limited, it is not suitable to promote uniform mixture between the sample liquid and the reagent by means of oscillation, and the oscillation process thereof may cause a series of problems, such as air leakage at the connection between the sample liquid driving apparatus 40 and the microfluidic biochip 10, liquid leakage at the sample inlet 111, or the like.

Figure 3:
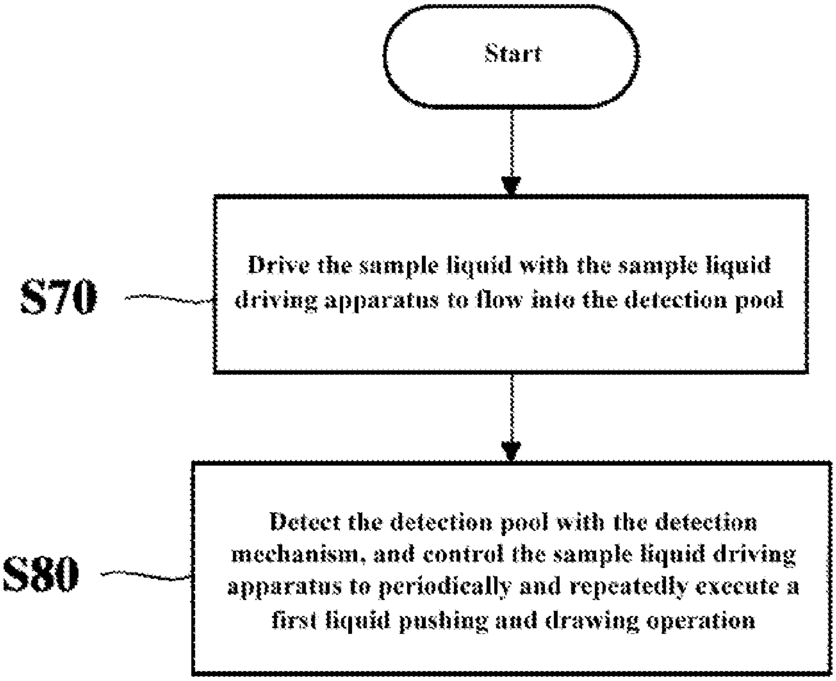
FIG. 3 is a schematic flow diagram of a control method for a microfluidic detection system according to a first embodiment of the present invention.

For this reason, the present application provides a control method for a microfluidic detection system; FIG. 3 is a schematic flow diagram of the control method for a microfluidic detection system according to a first embodiment of the present invention, and referring to FIG. 3, the control method according to the present invention includes:

- step S70: driving the sample liquid with the sample liquid driving apparatus 40 to flow into the detection pool 121; and
- step S80: detecting the detection pool 121 with the detection mechanism 20, and controlling the sample liquid driving apparatus 40 to periodically and repeatedly execute a first liquid pushing and drawing operation, the first liquid pushing and drawing operation including a first liquid pushing action used for prompting the sample liquid to flow in the direction of the sample inlet 111, and a first liquid drawing action used for prompting the sample liquid to flow in the direction of the detection pool 121.

In the microfluidic detection system according to the present invention, the sample liquid is driven to automatically flow into the microfluidic biochip by the sample liquid driving apparatus, a manual operation of a user is avoided, and accurate control is facilitated. In the control method according to the present application, the sample liquid driving apparatus 40 is controlled to periodically and repeatedly execute the first liquid pushing and drawing operation including the first liquid pushing action and the first liquid drawing action after the sample liquid flows into the detection pool 121; since driving forces applied to the sample liquid by the first liquid pushing action and the first liquid drawing action have opposite directions, the sample liquid can be promoted to repeatedly flow back and forth in the microfluidic biochip 10, thereby facilitating mixture between the sample liquid and the detection reagent, improving the mixing effect of the sample liquid and the detection reagent, facilitating the full reaction between the sample liquid and the detection reagent, and improving the accuracy of the detection result.

Further, in one and the same first liquid pushing and drawing operation, the quantity of the sample liquid pushed out by the sample liquid driving apparatus 40 performing the first liquid pushing action is the same as the quantity of the sample liquid drawn in by the sample liquid driving apparatus performing the first liquid drawing action. Thus, the final quantity of the sample liquid in the detection pool 121 can be guaranteed to be kept unchanged, and it is avoided that due to large error accumulation caused by executing the first liquid pushing and drawing operation multiple times, the accuracy of the detection result is affected.

In some embodiments, the microfluidic biochip 10 is further provided with a reaction pool 122 connected between the detection pool 121 and the sample inlet 111, and the sample inlet 111, the reaction pool 122, the detection pool 121 and the communication port 112 are sequentially communicated through a micro-channel 14 to form a main channel. For a specific sample liquid or for some specific detection parameters of the sample liquid, the sample liquid may be required to react with a reaction reagent first and then react with the detection reagent, and the detection mechanism detects a solution after the final reaction to obtain a preset detection parameter of the specific sample liquid, thus avoiding a reaction or mutual influence between the reaction reagent and the detection reagent, and improving the accuracy of the detection result. For example, when the microfluidic detection system 1 is required to be used to detect a pesticide residue parameter of the sample liquid, an enzyme inhibition rate method is preferred, and since a pesticide residue content is qualitatively detected in the method, the detection speed is higher, and the method is more suitable for household use. At this point, the reaction reagent and the detection reagent for the microfluidic biochip 10 may be an enzyme reagent and a color developing agent respectively. The reaction pool 122 is configured to allow the sample liquid to react with the enzyme reagent therein, and the sample liquid after the reaction with the enzyme reagent flows into the detection pool 121 to react with the color developing agent in the detection pool 121.

Figure 4:
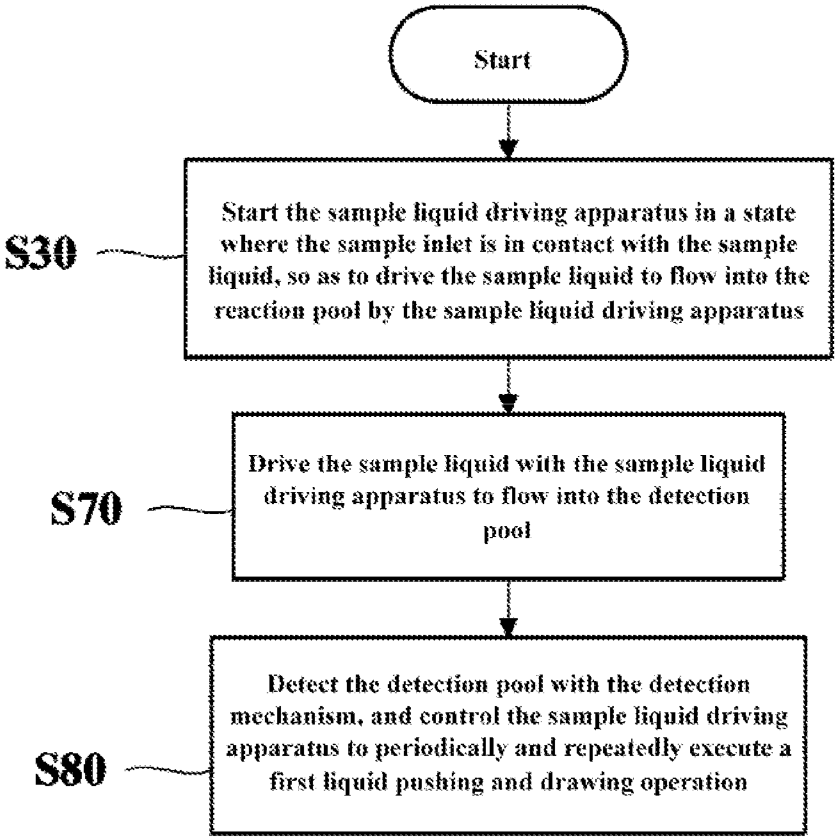
FIG. 4 is a schematic flow diagram of a control method for a microfluidic detection system according to a second embodiment of the present invention.

FIG. 4 is a schematic flow diagram of the control method for a microfluidic detection system according to a second embodiment of the present invention; referring to FIG. 4, in these embodiments, before the step S70 of driving the sample liquid to flow into the detection pool 121, the control method according to the present invention further includes:

step S30: starting the sample liquid driving apparatus 40 in a state where the sample inlet 111 is in contact with the sample liquid, so as to drive the sample liquid to flow into the reaction pool 122 by the sample liquid driving apparatus 40.

Figure 5:
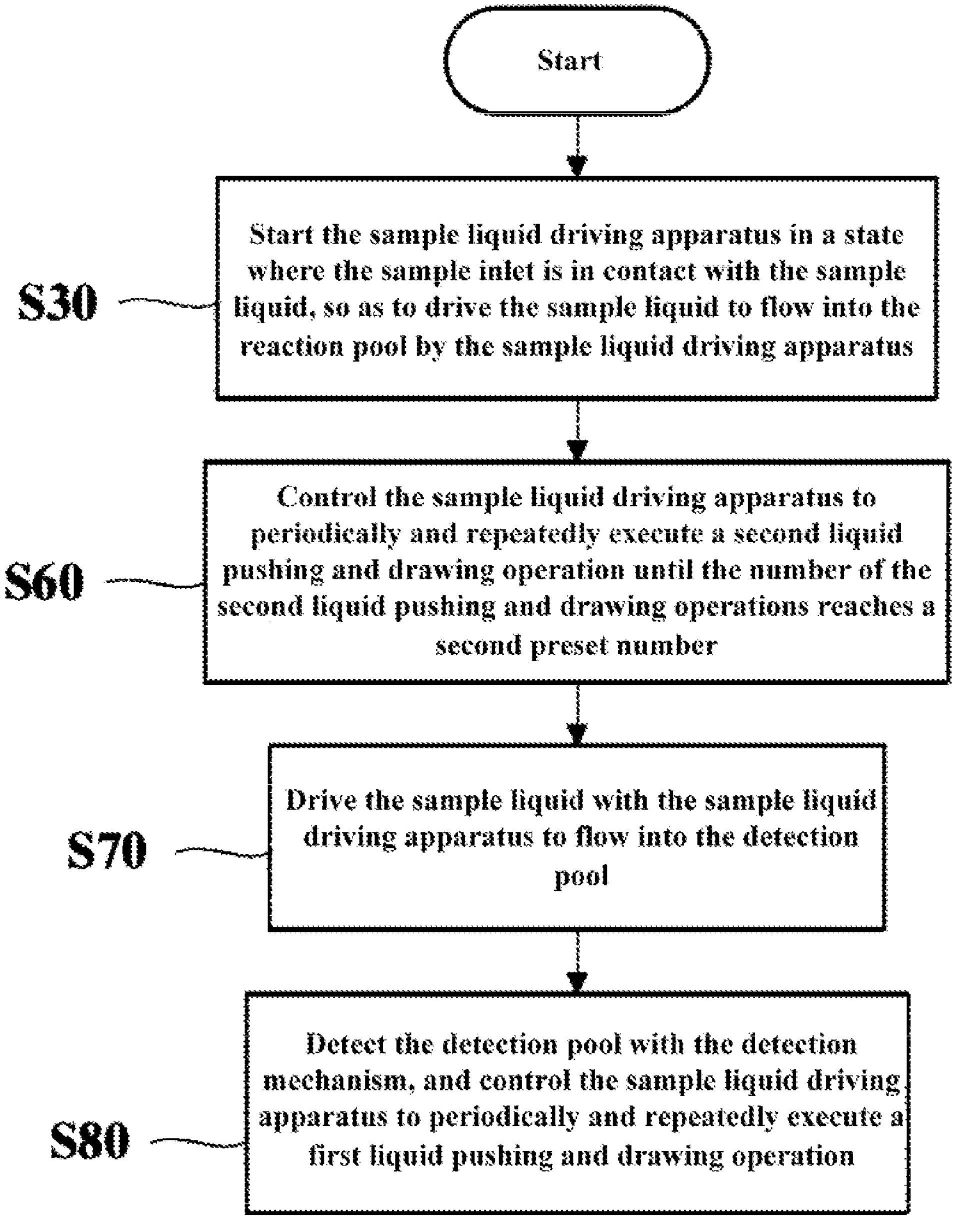
FIG. 5 is a schematic flow diagram of a control method for a microfluidic detection system according to a third embodiment of the present invention.

FIG. 5 is a schematic flow diagram of the control method for a microfluidic detection system according to a third embodiment of the present invention. Referring to FIG. 5, further, in order to improve the effect of mixture between the sample liquid and the reaction reagent, in some embodiments, after the step S30 of driving the sample liquid to flow into the reaction pool 122 and before the step S70 of driving the sample liquid to flow into the detection pool 121, the control method according to the present invention further includes:

step S60: controlling the sample liquid driving apparatus 40 to periodically and repeatedly execute a second liquid pushing and drawing operation until the number of the second liquid pushing and drawing operations reaches a second preset number. The second liquid pushing and drawing operation includes a second liquid pushing action for promoting the sample liquid to flow towards the sample inlet 111 and a second liquid drawing action for promoting the sample liquid to flow towards the reaction pool 122. The second preset number is a preset number for enabling the sample liquid and the reaction reagent to be uniformly mixed according to experimental verification.

Since driving forces applied to the sample liquid by the second liquid pushing action and the second liquid drawing action have opposite directions, the sample liquid can be promoted to repeatedly flow back and forth in the microfluidic biochip 10, thereby facilitating the mixture between the sample liquid and the reaction reagent, improving the mixing effect of the sample liquid and the reaction reagent, and facilitating the full action between the sample liquid and the reaction reagent.

Further, in one and the same second liquid pushing and drawing operation, the quantity of the sample liquid pushed out by the sample liquid driving apparatus 40 performing the second liquid pushing action is the same as the quantity of the sample liquid drawn in by the sample liquid driving apparatus performing the second liquid drawing action. Thus, the final quantity of the sample liquid in the reaction pool 122 can be guaranteed to be kept unchanged, and it is avoided that due to large error accumulation caused by executing the second liquid pushing and drawing operation multiple times, the quantity of the sample liquid flowing to the detection pool 121 is affected and thus the accuracy of the detection result is affected.

Figure 6:
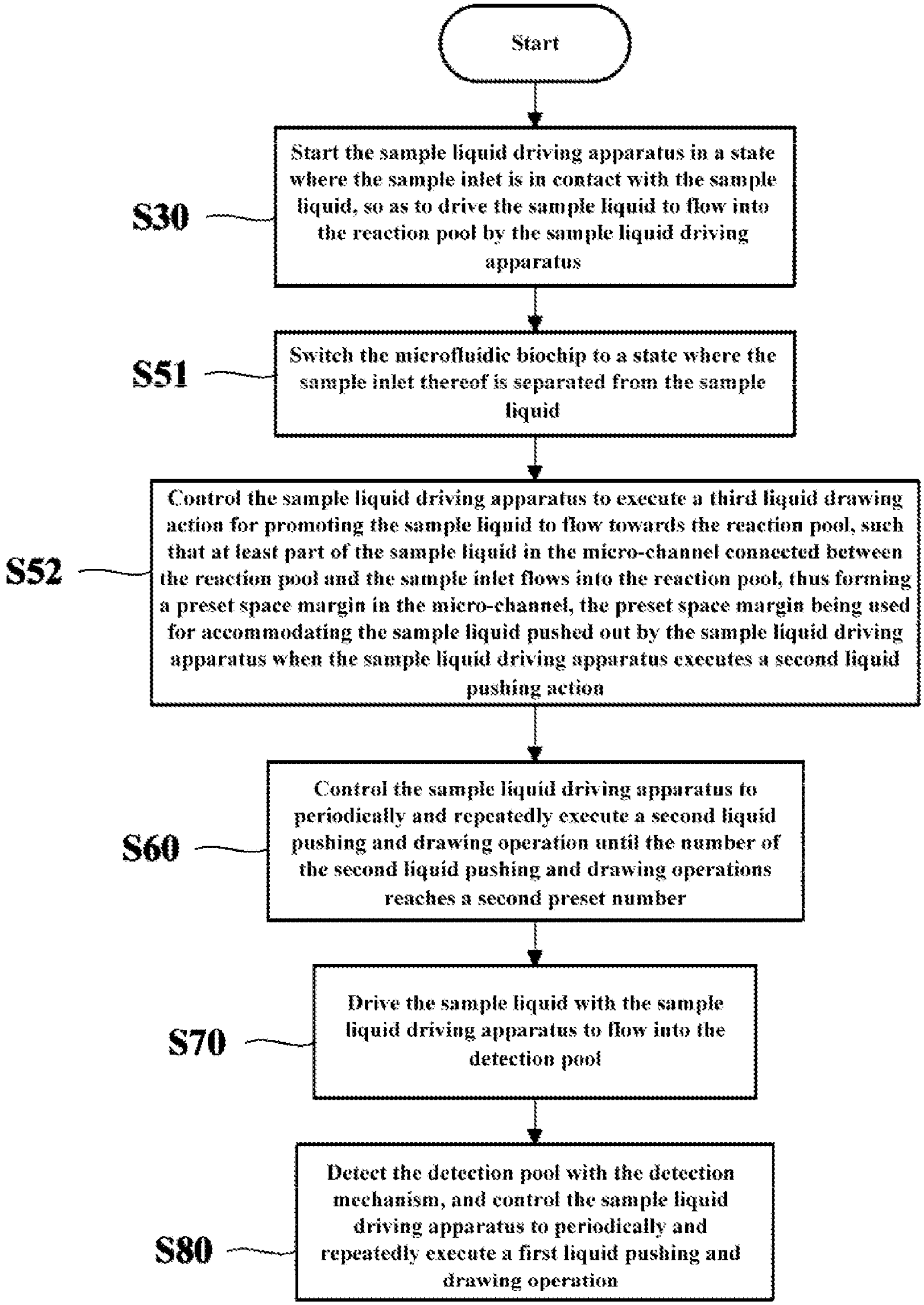
FIG. 6 is a schematic flow diagram of a control method for a microfluidic detection system according to a fourth embodiment of the present invention.

FIG. 6 is a schematic flow diagram of the control method for a microfluidic detection system according to a fourth embodiment of the present invention. Referring to FIG. 6, in some embodiments, after the step S30 of driving the sample liquid to flow into the reaction pool 122 and before the step S60 of controlling the sample liquid driving apparatus 40 to periodically and repeatedly execute a second liquid pushing and drawing operation, the control method according to the present invention further includes:

step S51: switching the microfluidic biochip 10 to a state where the sample inlet thereof is separated from the sample liquid; and step S52: controlling the sample liquid driving apparatus 40 to execute a third liquid drawing action for promoting the sample liquid to flow towards the reaction pool 122, such that at least part of the sample liquid in the micro-channel connected between the reaction pool 122 and the sample inlet 111 flows into the reaction pool 122, thus forming a preset space margin in the micro-channel, the preset space margin being used for accommodating the sample liquid pushed out by the sample liquid driving apparatus 40 when the sample liquid driving apparatus 40 executes the second liquid pushing action.

That is, after the sample liquid enters the reaction pool 122, the sample liquid driving apparatus 40 first executes a liquid drawing action (i.e., the third liquid drawing action), such that at least part of the sample liquid in the micro-channel connected between the reaction pool and the sample inlet flows into the reaction pool 122, thus forming the preset space margin in the micro-channel, the preset space margin being used for accommodating the sample liquid pushed out by the sample liquid driving apparatus 40 when the sample liquid driving apparatus 40 executes the second liquid pushing action. Thus, the problem of contamination due to a small quantity of the sample liquid being pushed out from the sample inlet 111 when the sample liquid driving apparatus 40 performs the second liquid pushing action can be avoided.

Certainly, in other embodiments, the control method according to the present invention may not include step S52, and it is only required to perform the second liquid drawing action first and then the second liquid pushing action when the sample liquid driving apparatus 40 performs the second liquid pushing and drawing operation. Thus, the preset space margin can also be reserved in the micro-channel between the reaction pool and the sample inlet, thus avoiding the problem of contamination due to a small quantity of the sample liquid being pushed out from the sample inlet 111 when the sample liquid driving apparatus 40 performs the second liquid pushing action.

Figure 7:
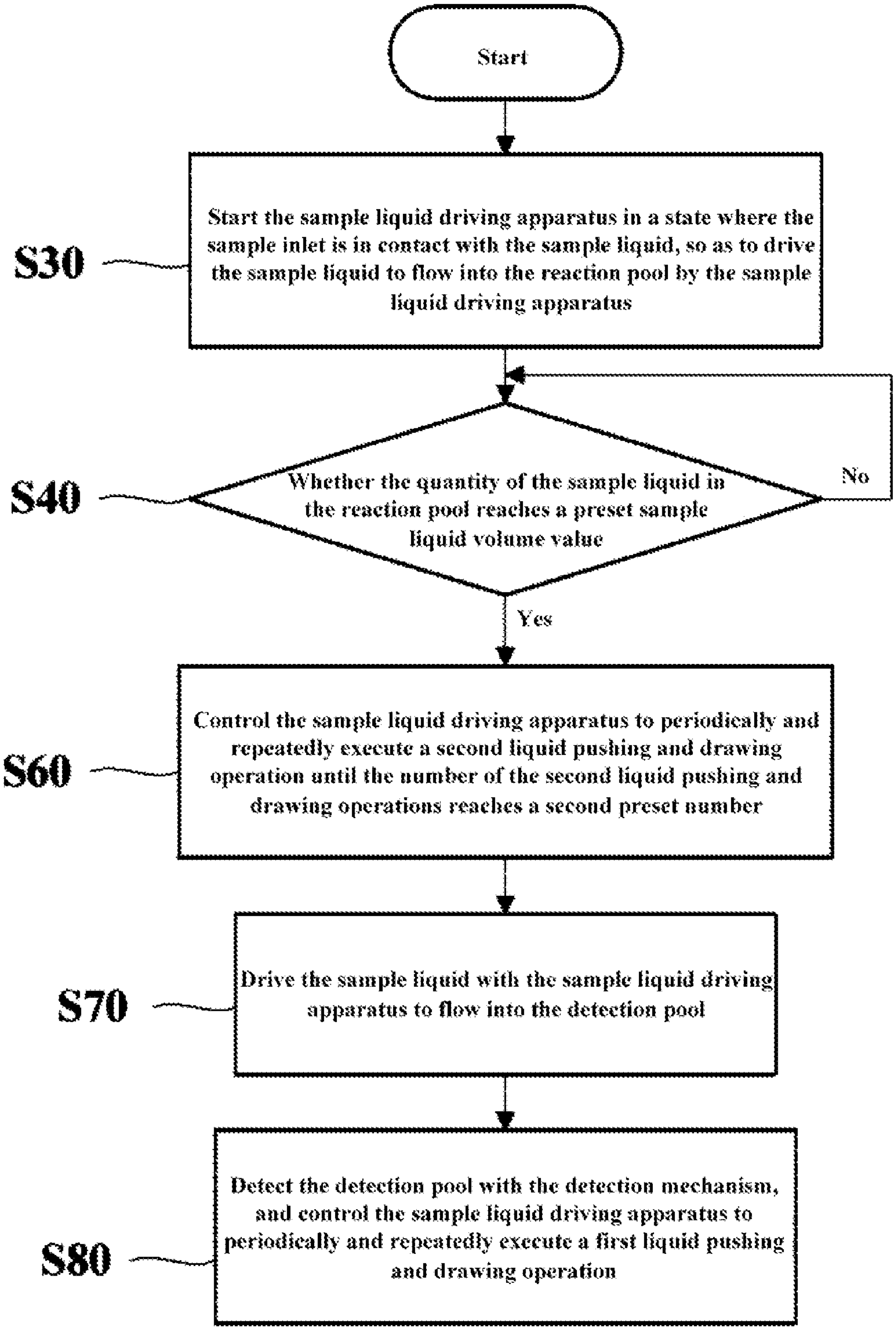
FIG. 7 is a schematic flow diagram of a control method for a microfluidic detection system according to a fifth embodiment of the present invention.

FIG. 7 is a schematic flow diagram of the control method for a microfluidic detection system according to a fifth embodiment of the present invention. Referring to FIG. 7, in some embodiments, after the step S30 of driving the sample liquid to flow into the reaction pool 122 and before the step S60 of controlling the sample liquid driving apparatus 40 to periodically and repeatedly execute a second liquid pushing and drawing operation, the control method further includes:

step S40: judging whether the quantity of the sample liquid in the reaction pool 122 reaches a preset sample liquid volume value; and if yes, proceeding to step S60 of controlling the sample liquid driving apparatus 40 to periodically and repeatedly execute the second liquid pushing and drawing operation.

That is, in the present application, the quantity of the sample liquid entering the reaction pool 122 is accurately detected and controlled to be matched with the quantities of the reaction reagent and the detection reagent in the chip, thus avoiding the influence on the detection result caused by too much or too little sample liquid, and further improving the accuracy of the detection result.

In some embodiments, the sample liquid driving apparatus 40 may form a negative pressure in the main channel of the microfluidic biochip 10 by pumping air outwards, such that the sample liquid in contact with the sample inlet 111 enters the main channel under the action of the negative pressure. Specifically, the sample liquid driving apparatus 40 may be a micro injection pump, and further includes a driving motor, an injector, a lead screw, a slider, a piston, or the like. The quantity of displacement of the piston within the injector is positively correlated to the quantity of the sample liquid entering the microfluidic biochip 10. Therefore, the quantity of the sample liquid entering the microfluidic biochip 10 can be determined by detecting the position of the piston by a position sensor.

In these embodiments, the step S40 of judging whether the quantity of the sample liquid in the reaction pool 122 reaches a preset sample liquid volume value may specifically include:

judging whether a trigger signal for indicating that the piston of the sample liquid driving apparatus 40 moves to a preset position is received; and if yes, determining that the quantity of the sample liquid in the reaction pool 122 reaches the preset sample liquid volume value; and if no, considering that the quantity of the sample liquid in the reaction pool 122 does not reach the preset sample liquid volume value.

It may be understood that, in some embodiments, steps S51 and S52 of the method shown in FIG. 6 may also be included in the control method shown in FIG. 7. Specifically, steps S51 and S52 may occur between steps S40 and S60.

Figure 8:
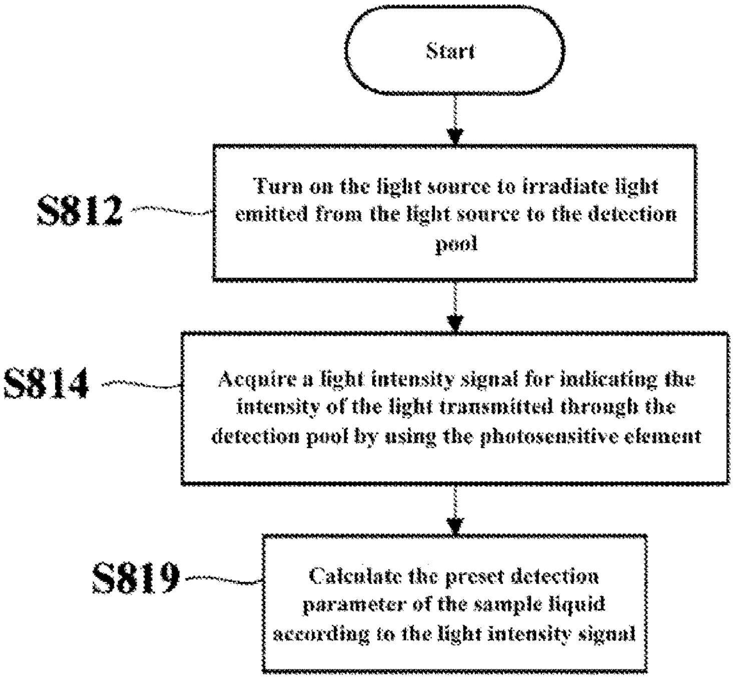
FIG. 8 is a schematic flow diagram of detection of a detection pool by a detection mechanism in an embodiment of the present invention.

FIG. 8 is a schematic flow diagram of detection of the detection pool by the detection mechanism in an embodiment of the present invention. In some embodiments, the detection mechanism 20 may include a light source and a photosensitive element arranged on two opposite sides of the detection pool 121 respectively; the step of detecting the detection pool 121 with the detection mechanism 20 includes:

step S812: turning on the light source to irradiate light emitted from the light source to the detection pool 121;

step S814: acquiring a light intensity signal for indicating the intensity of the light transmitted through the detection pool 121 by using the photosensitive element; and step S819: calculating the preset detection parameter of the sample liquid according to the light intensity signal.

Taking the detection of the pesticide residue parameter of the sample liquid by the microfluidic detection system 1 as an example, the reaction reagent held in the reaction pool 122 may be an enzyme reagent, and the detection reagent held in the detection pool 121 may be a color developing agent. After the sample liquid enters the reaction pool 122, pesticide residues in the sample liquid react with the enzyme reagent using the principle that a pesticide may inhibit the activity of enzyme. The solution after the reaction enters the detection pool 121. The light emitted from the light source 21 is irradiated to the detection pool 121, and the light transmitted through the detection pool 121 is introduced into the photosensitive element 22, which facilitates judgment of the change in an absorbance in the detection pool 121 using the light intensity signal received by the photosensitive element, and then facilitates calculation of to a pesticide residue inhibition rate.

Figure 9:
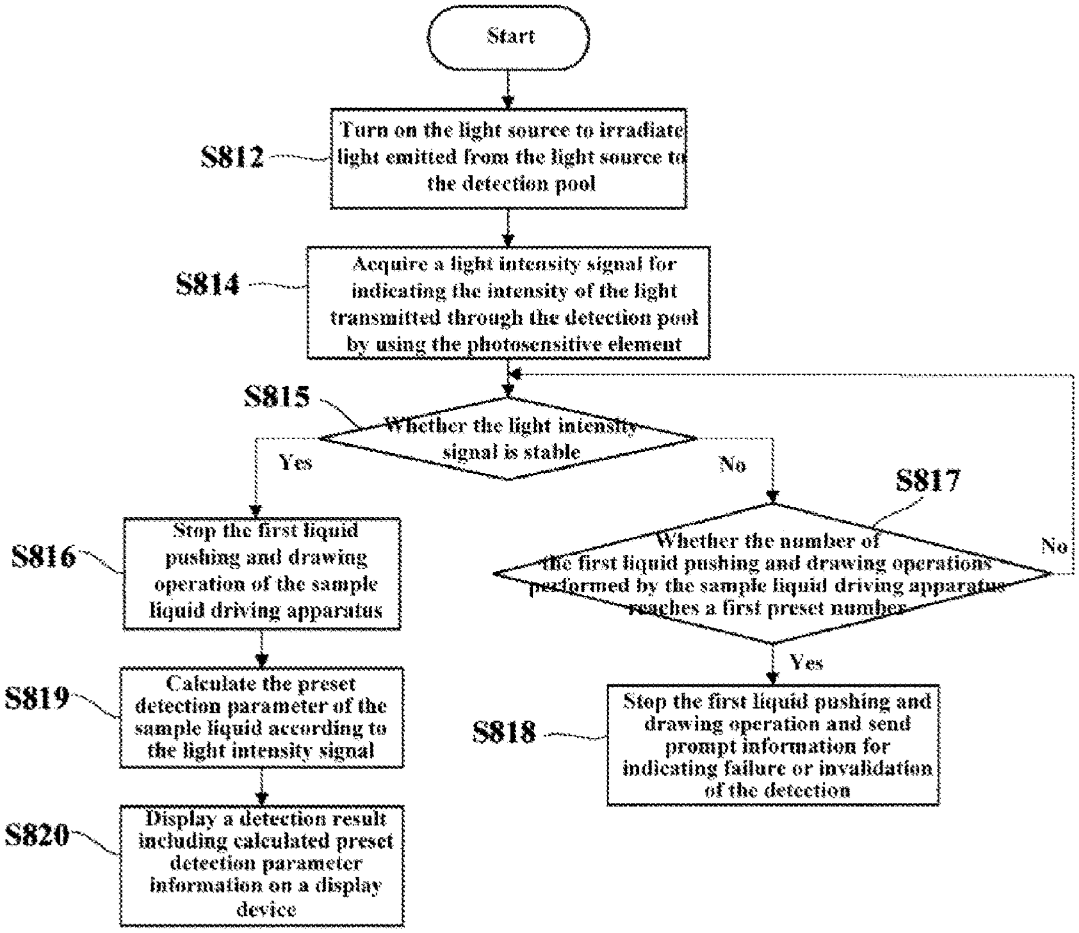
FIG. 9 is a schematic flow diagram of detection of a detection pool by a detection mechanism in another embodiment of the present invention.

FIG. 9 is a schematic flow diagram of the detection of the detection pool by the detection mechanism in another embodiment of the present invention. Further, after the step S814 of acquiring a light intensity signal and before the step S818 of calculating the preset detection parameter of the sample liquid according to the light intensity signal, the control method according to the present application further includes:

step S815: judging whether the light intensity signal is stable; if yes, proceeding to step S816, and if no, proceeding to step S817;

step S816: stopping the first liquid pushing and drawing operation of the sample liquid driving apparatus 40, and proceeding to step S819;

step S817: judging whether the number of the first liquid pushing and drawing operations performed by the sample liquid driving apparatus 40 reaches a first preset number; if yes, proceeding to step S818; if no, proceeding to step S815 to continuously judge the stability of the light intensity signal; and step S818: stopping the first liquid pushing and drawing operation and sending prompt information for indicating failure or invalidation of the detection.

It may be understood that the relatively stable light intensity signal can be received only after the sample liquid and the detection reagent fully react, and the preset detection parameter of the sample liquid calculated according to the stable light intensity signal is relatively accurate. Therefore, whether the sample liquid and the detection reagent fully react can be judged by judging whether the light intensity signal is stable. If the sample liquid and the detection reagent fully react, the sample liquid driving apparatus 40 is not required to go on performing the first liquid pushing and drawing operation, and the first liquid pushing and drawing operation may be stopped in time to reduce energy consumption. If the relatively stable light intensity signal is not received after the number of the first liquid pushing and drawing operations reaches the first preset number, the sample liquid and the detection reagent may not fully react, for example, the detection reagent loses efficacy or other reasons occur; at this point, timely stopping of the first liquid pushing and drawing operation may reduce energy consumption, prompt information is sent to remind the user that the detection is invalid or fails, and the user can conveniently make corresponding measures in time.

In one embodiment, the control method according to the present invention further includes:

after receiving a trigger signal for instructing starting of the detection function of the microfluidic detection system, starting a heating module of the microfluidic detection system, and heating the detection pool 121 by the heating module;

acquiring the temperature of the detection pool 121 periodically or in real time; and stopping the heating module when the temperature of the detection pool 121 is higher than a preset upper temperature limit value, and restarting the heating module when the temperature in the detection pool 121 is lower than a preset lower temperature limit value.

Thus, the detection pool 121 may be guaranteed to always have a relatively constant temperature before the detection operation is performed, thus facilitating the sufficient reaction of the sample liquid and the detection reagent. Specifically, the trigger signal for instructing the starting of the detection function of the microfluidic detection system may be an electrifying signal of the microfluidic detection system, or a starting signal received by a main switch of the microfluidic detection system for starting the detection function thereof.

In some embodiments, after stopping the first liquid pushing and drawing operation of the sample liquid driving apparatus 40, the control method according to the present invention further includes:

turning off the light source and stopping the heating module. This step may occur before or after step S819.

It should be noted that the starting operation of the heating module, the temperature acquisition of the heating module, and the temperature control of the heating module are continuously performed during the whole detection process, so as to ensure that the detection pool 121 has a relatively constant temperature range all the time during the whole detection process.

In some embodiments, after the step S819 of calculating the preset detection parameter of the sample liquid according to the light intensity signal, the control method according to the present invention further includes:

step S820: displaying a detection result including calculated preset detection parameter information on a display device. The display device may be, for example, a display screen, or a color indicator lamp, or include both a display screen and a color indicator lamp.

Figure 10:
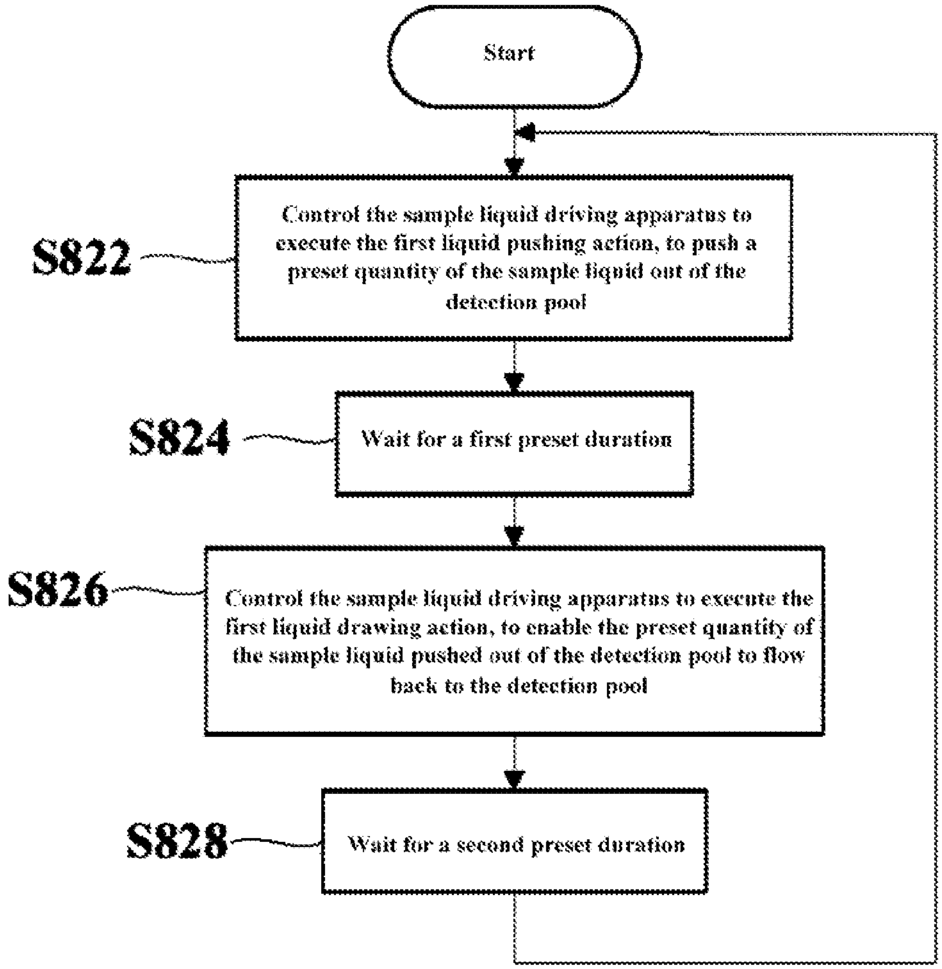
FIG. 10 is a schematic flow diagram of controlling a sample liquid driving apparatus to periodically and repeatedly execute a first liquid pushing and drawing operation in an embodiment of the present invention.

FIG. 10 is a schematic flow diagram of controlling the sample liquid driving apparatus to periodically and repeatedly execute the first liquid pushing and drawing operation in an embodiment of the present invention. In some embodiments, controlling the sample liquid driving apparatus 40 to periodically and repeatedly execute the first liquid pushing and drawing operation specifically includes:

step S822: controlling the sample liquid driving apparatus 40 to execute the first liquid pushing action, to push a preset quantity of the sample liquid out of the detection pool 121;

step S824: waiting for a first preset duration;

step S826: controlling the sample liquid driving apparatus 40 to execute the first liquid drawing action, to enable the preset quantity of the sample liquid pushed out of the detection pool 121 to flow back to the detection pool 121; and step S828: waiting for a second preset duration, and then proceeding to step S822.

Specifically, the quantity of the sample liquid pushed out by the first liquid pushing action and the quantity of the sample liquid drawn in by the first liquid drawing action can be monitored and controlled by the displacement quantity of the piston of the sample liquid driving apparatus 40 in the injector thereof. For example, the pushed-out sample liquid is considered to reach a preset quantity when the piston moves downwards by a preset distance in the injector, and the drawn-in sample liquid is considered to reach a preset quantity when the piston moves upwards by a preset distance in the injector. The first preset duration and the second preset duration may be equal to or different from each other. After each liquid pushing action or liquid drawing action is executed, the next action is executed after a period of time, which may give the time for full mixture and reaction of the sample liquid and the detection reagent.

It should be noted that the specific process of controlling the sample liquid driving apparatus 40 to periodically and repeatedly execute the second liquid pushing and drawing operation is quite similar to the process of controlling the sample liquid driving apparatus 40 to periodically and repeatedly perform the first liquid pushing and drawing operation, and therefore is not repeated here.

Before the microfluidic biochip 10 is detected, the sample liquid is required to be added to the microfluidic biochip 10; that is, the control method according to the present invention further includes a sample loading part, which is specifically described below.

Figure 11:
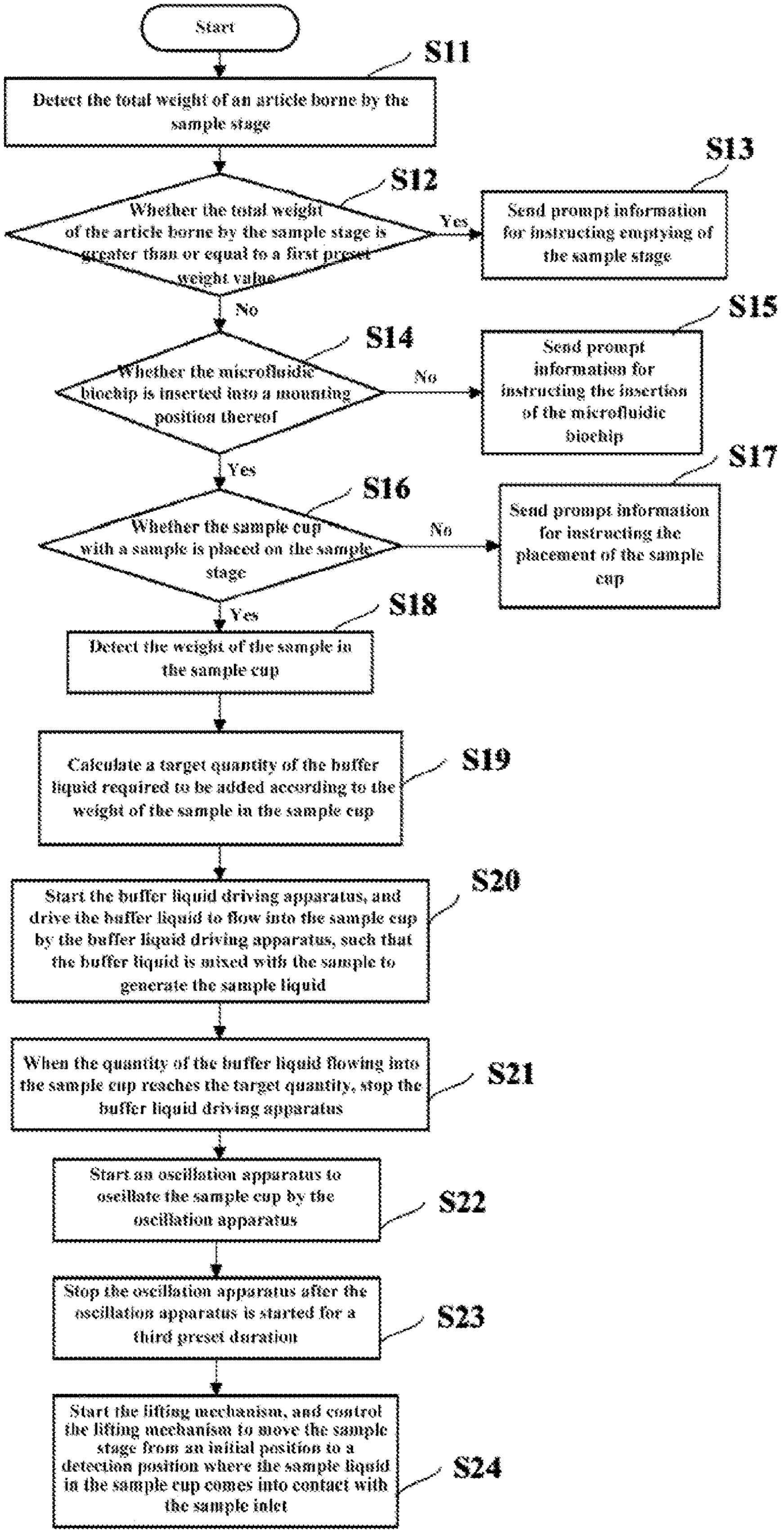
FIG. 11 is a schematic flow diagram of a sample loading process of a microfluidic detection system according to an embodiment of the present invention.

FIG. 11 is a schematic flow diagram of a sample loading process of the microfluidic detection system according to an embodiment of the present invention. The microfluidic detection system 1 further includes a sample stage 70 for placing the sample cup, a lifting mechanism 60 for driving the sample stage 70 to move, and a buffer liquid driving apparatus 30 for driving a buffer liquid to flow into the sample cup. Referring to FIG. 11, before starting the sample liquid driving apparatus 40, the control method according to the present invention further includes:

step S11: detecting the total weight of an article borne by the sample stage 70;

step S12: judging whether the total weight of the article borne by the sample stage 70 is greater than or equal to a first preset weight value; if yes, proceeding to step S13, and if no, proceeding to step S14;

step S13: sending prompt information for instructing emptying of the sample stage 70;

step S14: judging whether the microfluidic biochip 10 is inserted into a mounting position thereof; if yes, proceeding to step S16, and if no, proceeding to step S15;

step S15: sending prompt information for instructing the insertion of the microfluidic biochip 10;

step S16: judging whether the sample cup is placed on the sample stage 70; if yes, proceeding to step S18, and if no, proceeding to step S17;

step S17: sending prompt information for instructing the placement of the sample cup;

step S18: detecting the weight of a sample in the sample cup;

step S19: calculating a target quantity of the buffer liquid required to be added according to the weight of the sample in the sample cup;

step S20: starting the buffer liquid driving apparatus 30, and driving the buffer liquid to flow into the sample cup by the buffer liquid driving apparatus 30, such that the buffer liquid is mixed with the sample in the sample cup to generate the sample liquid; specifically, the buffer liquid driving apparatus 30 being communicated with a buffer liquid bottle 36 to supply the buffer liquid to the buffer liquid driving apparatus 30 through the buffer liquid bottle 36;

step S21: when the quantity of the buffer liquid flowing into the sample cup reaches the target quantity, stopping the buffer liquid driving apparatus 30;

step S22: starting an oscillation apparatus to oscillate the sample cup by the oscillation apparatus;

step S23: stopping the oscillation apparatus after the oscillation apparatus is started for a third preset duration; and step S24: starting the lifting mechanism 60, and controlling the lifting mechanism 60 to move the sample stage 70 from an initial position to a detection position where the sample liquid in the sample cup comes into contact with the sample inlet 111.

Thus, a user only needs to place the sample cup onto the sample stage, and no other operations are needed, thus, the sample loading operation is convenient, the degree of automation is high, the method is time-saving and labor-saving, and the usage experience of the user is improved. Before the sample stage 70 is controlled to move, the buffer liquid is automatically injected into the sample cup when the sample cup storing the sample is placed on the sample stage 70, and is mixed with the sample to generate the sample liquid, thus omitting a process that the user manually prepares the sample liquid, avoiding the problem that the quantity or concentration of the sample liquid is not well controlled due to manual preparation of the sample liquid, improving the accuracy of the concentration and quantity of the sample liquid, and laying a foundation for the accuracy of the detection result. In the present application, the weight of the sample may also be automatically obtained, and the buffer liquid with the target quantity is automatically calculated and output according to the weight of the sample, such that the user can conveniently take the sample at will, and the accuracy of the detection result can be guaranteed. In the present application, a to-be-detected substance on the sample is promoted to be fully dissolved into the buffer liquid by the oscillation apparatus, so as to form the sample liquid with a proper concentration, thus avoiding the problem that the detection result is inaccurate due to an over low concentration of the sample liquid. In the present application, whether the microfluidic biochip 10 is mounted is automatically detected before detecting whether the sample cup is placed on the sample stage 70, and if no, the prompt information is sent to prompt the user to mount the microfluidic biochip, such that the user can conveniently and rapidly mount the microfluidic biochip before the sample cup is placed. In the present application, whether other articles (for example, a sample cup left in previous detection or other articles placed on the sample stage by the user) exist on the sample stage is automatically detected before detecting whether the microfluidic biochip 10 is mounted, and if yes, the prompt information for emptying the sample stage is sent out, such that the user can perform operations according to the prompt information, thus improving the automation degree of the microfluidic detection system, and improving the use experience of the user.

Further, when the quantity of the sample liquid in the reaction pool 122 reaches the preset sample liquid volume value, the control method according to the present invention further includes:

controlling the lifting mechanism 60 to return the sample stage 70 to the initial position thereof.

The present invention further provides a microfluidic detection system 1 operating according to the control method according to any one of the above-mentioned embodiments.

Specifically, the microfluidic detection system 1 may include a microfluidic biochip 10 for providing detection conditions and detection environments, a sample stage 70 for placing a sample cup, a lifting mechanism 60 for driving the sample stage 70 to move, a sample liquid driving apparatus 40 for driving a sample liquid to flow, a buffer liquid driving apparatus 30 for driving a buffer liquid to flow into the sample cup, a detection mechanism 20 for performing a detection operation, and a buffer liquid bottle 36 for storing the buffer liquid. The sample stage 70 may be located below the microfluidic biochip 10, such that the sample liquid in the sample cup thereon is in contact with a sample inlet 111 located at the bottom of the microfluidic biochip 10. The lifting mechanism 60 is adjacently provided on a transverse side of the sample stage 70, so as to drive the sample stage 70 to move up and down. The buffer liquid driving apparatus 30 may be provided on one side of the microfluidic biochip 10 in the transverse direction and located above the lifting mechanism 60, the sample liquid driving apparatus 40 may be provided on the other side of the microfluidic biochip 10 in the transverse direction, and the buffer liquid bottle 36 is located on a side of the sample liquid driving apparatus 40 away from the microfluidic biochip 10. Thus, the size features of each module in the vertical direction and the transverse direction can be fully utilized, such that the layout of the modules is more compact, and the occupied space is reduced as far as possible. Moreover, the modules are only arranged side by side in the vertical direction and the transverse direction, such that the thickness of the microfluidic detection system 1 in the front and rear direction is reduced as far as possible, and the microfluidic detection system is more suitable for being integrated on a refrigerator.

Figure 12:
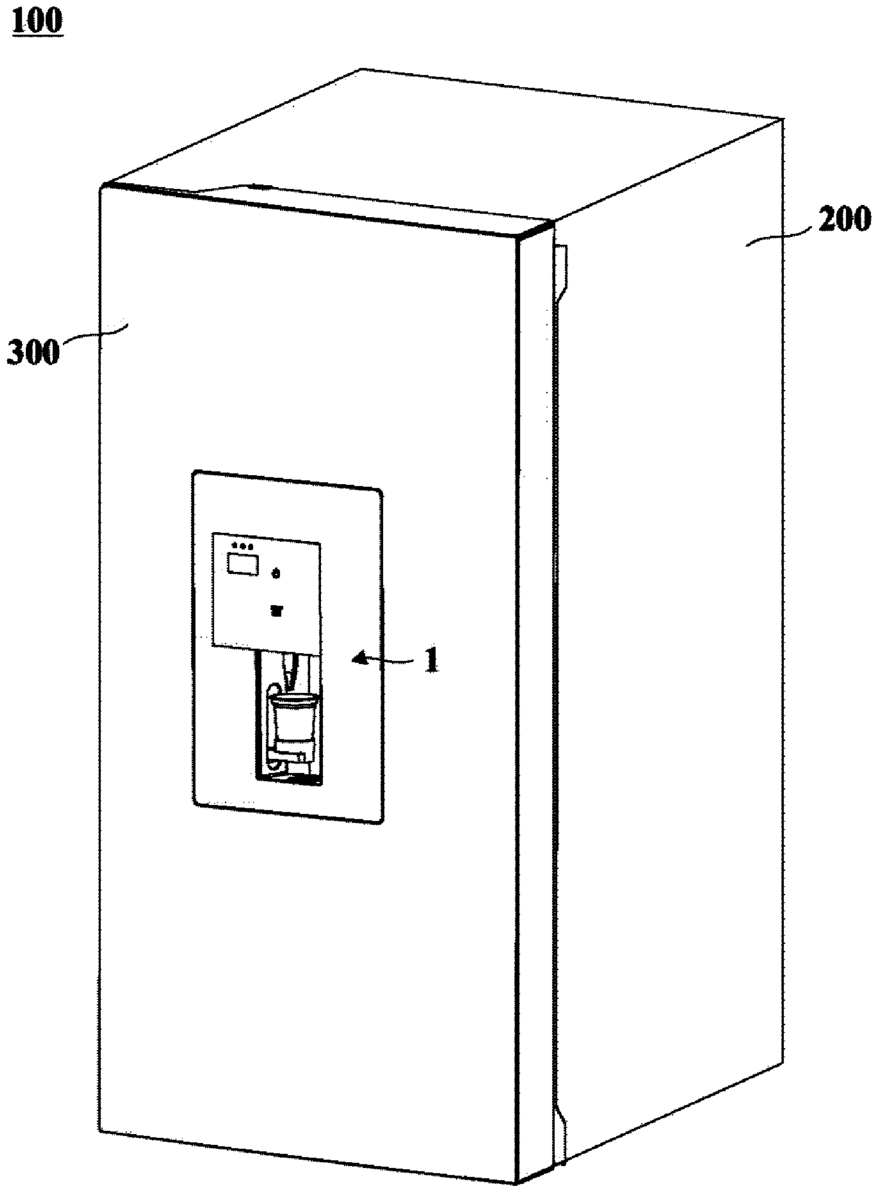
FIG. 12 is a schematic structural diagram of a refrigerator according to an embodiment of the present invention.

The present invention further provides a refrigerator, and FIG. 12 is a schematic structural diagram of the refrigerator according to an embodiment of the present invention; the refrigerator 100 according to the present invention includes the microfluidic detection system 1 operating according to the control method according to any one of the above embodiments, so as to integrate the microfluidic detection system 1 on the refrigerator 100. The refrigerator 100 is frequently used in daily life, and mainly configured to store food materials, and when the microfluidic detection system 1 is integrated on the refrigerator 100, a user can conveniently perform a detection operation of a food material sample by using the microfluidic detection system 1.

Further, the refrigerator 100 further includes a cabinet 200 and a door 300, the cabinet 200 defines a storage space therein, and the door 300 is connected to the cabinet 200 and configured to open and/or close the storage space. The microfluidic detection system 1 is preferably provided on the door 300, such that the operation is convenient, an original storage space in the cabinet 200 cannot be occupied, and the storage capacity of the refrigerator 100 cannot be influenced. The microfluidic detection system 1 may be electrically connected to an electrical control apparatus of the refrigerator 100, so as to provide power for the microfluidic detection system 1 by the electrical control apparatus and/or to allow signals to be transmitted between the electrical control apparatus and the microfluidic detection system 1.

The refrigerator 100 according to the present application is a refrigerator in a broad sense, and includes not only a so-called refrigerator in a narrow sense, but also a storage apparatus having a refrigerating, freezing or other storage function, for example, a refrigerating box, a freezer, or the like.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A control method for a microfluidic detection system, the microfluidic detection system comprising a microfluidic biochip, a sample liquid driving apparatus and a detection mechanism; the microfluidic biochip comprising a sample inlet for receiving a sample liquid flowing into the microfluidic biochip from a sample cup, a connecting port connected with the sample liquid driving apparatus, a detection pool formed inside the microfluidic biochip, a reaction pool connected between the detection pool and the sample inlet, and a micro-channel; and the sample inlet, the reaction pool, the detection pool and the connecting port being fluidically connected in sequence through the micro-channel; the control method comprising:

starting the sample liquid driving apparatus in a state where the sample inlet is in contact with the sample liquid in the sample cup, so as to drive the sample liquid to flow into the reaction pool by the sample liquid driving apparatus;

switching the microfluidic biochip to a state where the sample inlet of the microfluidic biochip is separated from the sample liquid;

controlling the sample liquid driving apparatus to execute a third liquid drawing action for promoting the sample liquid to flow towards the reaction pool from the sample inlet, such that at least part of the sample liquid in the micro-channel connected between the reaction pool and the sample inlet flows into the reaction pool, thus forming a space margin in the micro-channel between the reaction pool and the sample inlet, the space margin being used for accommodating sample liquid pushed out of the reaction pool by the sample liquid driving apparatus when the sample liquid driving apparatus executes a second liquid pushing action, so as to avoid the sample liquid from being pushed out of the microfluidic biochip from the sample inlet when the second liquid pushing action is executed;

controlling the sample liquid driving apparatus to periodically and repeatedly execute a second liquid pushing and drawing operation until a number of the second liquid pushing and drawing operations reaches a second set number; the second liquid pushing and drawing operation comprising the second liquid pushing action for promoting the sample liquid to flow towards the sample inlet from the reaction pool and a second liquid drawing action, after the second liquid pushing action, for promoting the sample liquid to flow back to the reaction pool;

driving the sample liquid with the sample liquid driving apparatus to flow into the detection pool from the reaction pool; and detecting the detection pool with the detection mechanism, and during a detection process, controlling the sample liquid driving apparatus to periodically and repeatedly execute a first liquid pushing and drawing operation, the first liquid pushing and drawing operation comprising a first liquid pushing action used for prompting the sample liquid to flow towards the sample inlet from the detection pool, and a first liquid drawing action, after the first liquid pushing action, used for prompting the sample liquid to flow back to the detection pool.

2. The control method according to claim 1, wherein after driving the sample liquid to flow into the reaction pool and before controlling the sample liquid driving apparatus to periodically and repeatedly execute a second liquid pushing and drawing operation, the control method further comprises:

judging whether a quantity of the sample liquid in the reaction pool reaches a set sample liquid volume value; and if yes, controlling the sample liquid driving apparatus to periodically and repeatedly execute the second liquid pushing and drawing operation.

3. The control method according to claim 2, wherein the step of judging whether a quantity of the sample liquid in the reaction pool reaches a set sample liquid volume value comprises:

judging whether a piston of the sample liquid driving apparatus moves to a set position; and if yes, determining that the quantity of the sample liquid in the reaction pool reaches the set sample liquid volume value.

4. The control method according to claim 1, wherein the detection mechanism comprises a light source and a photosensitive element arranged on two opposite sides of the detection pool; the step of detecting the detection pool with the detection mechanism comprises:

turning on the light source to irradiate light emitted from the light source to the detection pool;

acquiring a light intensity signal for indicating the intensity of light transmitted through the detection pool by using the photosensitive element; and calculating a detection parameter of the sample liquid according to the light intensity signal.

5. The control method according to claim 4, further comprising:

after starting a detection function of the microfluidic detection system, starting a heating module of the microfluidic detection system, and heating the detection pool by the heating module;

acquiring a temperature of the detection pool periodically or in real time; and stopping the heating module when the temperature of the detection pool is higher than an upper temperature limit value, and restarting the heating module when the temperature in the detection pool is lower than a preset lower temperature limit value.

6. The control method according to claim 5, wherein after stopping the first liquid pushing and drawing operation of the sample liquid driving apparatus, the control method further comprises:

turning off the light source and stopping the heating module.

7. The control method according to claim 1, wherein in one first liquid pushing and drawing operation, a quantity of the sample liquid pushed out by the sample liquid driving apparatus performing the first liquid pushing action is identical to a quantity of the sample liquid sucked in by the sample liquid driving apparatus performing the first liquid drawing action; and in one second liquid pushing and drawing operation, a quantity of the sample liquid pushed out by the sample liquid driving apparatus performing the second liquid pushing action is identical to a quantity of the sample liquid sucked in by the sample liquid driving apparatus performing the second liquid drawing action.

8. The control method according to claim 1, wherein controlling the sample liquid driving apparatus to periodically and repeatedly execute the first liquid pushing and drawing operation comprises:

controlling the sample liquid driving apparatus to execute the first liquid pushing action, to push a set quantity of the sample liquid out of the detection pool;

after waiting for a first set duration, controlling the sample liquid driving apparatus to execute the first liquid drawing action, to enable the sample liquid pushed out of the detection pool to flow back to the detection pool; and after waiting for a second set duration, controlling the sample liquid driving apparatus to execute the first liquid pushing action again.

* * * * *